United States Patent [19]

McCabe

[11] 3,890,290

[45] June 17, 1975

[54] APPARATUS FOR FILTERING PARTICULATE MATTER FROM A FLUID STREAM

[75] Inventor: Robert V. McCabe, Harrisville, Pa.

[73] Assignee: ESM, Inc., Valencia, Pa.

[22] Filed: Feb. 21, 1974

[21] Appl. No.: 444,393

[52] U.S. Cl. .................... 210/136; 55/302; 55/341; 55/380
[51] Int. Cl. .......................................... B01d 29/38
[58] Field of Search .......... 210/315, 342, 428, 433, 210/136, 333; 55/380, 410, 413, 432, 302, 341

[56] References Cited
UNITED STATES PATENTS

| | | | |
|---|---|---|---|
| 1,208,994 | 3/1916 | Lion | 55/380 X |
| 1,363,753 | 12/1920 | Quinn | 55/380 |
| 2,432,757 | 12/1947 | Weniger | 55/432 X |
| 2,768,707 | 10/1956 | Campbell | 55/432 X |
| 3,421,666 | 1/1969 | Lawson | 55/432 X |
| 3,429,108 | 2/1969 | Larson | 55/432 |
| 3,443,366 | 5/1969 | Schwab | 55/380 X |

Primary Examiner—Frank A. Spear, Jr.
Attorney, Agent, or Firm—Stanley J. Price, Jr.

[57] ABSTRACT

A first fabric housing of a woven filter media supporting at its upper and lower end portions by retaining rings includes a longitudinal chamber open at the upper and lower end portions thereof for receiving a fluid stream with entrained particulate matter to be filtered therefrom. A second fabric housing having a longitudinal chamber is concentrically positioned with the first housing and is secured at preselected intervals to the interior surface of the first housing to thereby form a plurality of separate and distinct longitudinal passageways between the first and second housings. The portion of the fluid stream which flows outwardly through the first housing is substantially free of entrained particulate matter which collects on the interior surface of the first housing. The portion of the fluid stream with entrained particulate matter remaining in the first housing chamber enters the open lower end portions of the longitudinal passageways with the fluid stream passing either outwardly through the first housing or inwardly into the chamber of the second housing. The particulate matter is retained within the passageways which are sealed at their upper end portions and collects on the interior surface of the first housing and on the exterior surface of the second housing. The filtered stream, substantially free of particulate matter, passes through the open upper end portion of the second housing chamber to the surrounding atmosphere.

7 Claims, 9 Drawing Figures

PATENTED JUN 17 1975         SHEET   1                    3,890,290

PATENTED JUN 17 1975  3,890,290

SHEET 2

APPARATUS FOR FILTERING PARTICULATE MATTER FROM A FLUID STREAM

BACKGROUND OF THE INVENTION

1. Field of the Invention

This invention relates to apparatus for filtering particulate material from a fluid stream and more particularly to a filtration apparatus having an inner fabric housing secured within an outer fabric housing thereby forming a plurality of longitudinal passageways in which entrained particulate matter is separated from the fluid stream as the stream passes through the inner and outer fabric housings.

2. Description of the Prior Art

Conventional filtering devices are known in which a fluid stream with entrained particulate matter is directed through a screen-type filter mat fabricated of coarse glass fibers such as are commonly found in commercially available hot air furnaces and air conditioners. The fluid stream is directed in a path perpendicular to the plane of the mat, and consequently the effective filter area is limited to the planar surface through which the fluid stream passes. Furthermore, the capability of the mat to filter the particulate matter from the fluid stream decreases as the filter media becomes saturated with particulate matter. A natural consequence of the reduced filter efficiency of the mat is a buildup of back pressure exerted upon the blower which ultimately serves to impede the air flow and overall filter efficiency. In addition, conventional screen-type filter mats provide relatively small surface areas through which the area of air passes with the ultimate disadvantage of having a large area of filtering media and a corresponding large ratio of fluid area to filter media area.

U.S. Pat. No. 2,774,443 discloses a strainer-type filter adapted for separating dust and foreign particles from an air or gas stream. To increase the effective filter area, a sheet or mat of very fine fibers formed of glass is mounted upon a wire supporting structure. The glass fiber mat is lapped upon itself to form a four celled configuration in which the wire support structure secures the lapped portion in a tubular or bag-like configuration having an open end portion and a closed end portion. With this arrangement, the air or gas entrained particles enter the open end portion of the bag, coming in contact with the filter media. The air passes through the filter media with the particles collecting on the inside surface of the filter bags.

More recently, double wall filter cartridges have been adapted for use with conventional dust collectors. An inner cylindrical bag fabricated from a suitable woven material, such as cotton, wool, nylon and the like, is concentrically positioned within a wire support cage which is, in turn, surrounded by a fabric of the same type to form an outer cylindrical bag. Air with entrained particles passes outwardly through the inner bag and inwardly through the outer bag into an annular passageway formed between the inner and outer bags. The dust particles are collected on the outside surface of the outer bag and on the inside surface of the inner bag. The filtered air passes upwardly through the annular passageway and is discharged from the top portion of the outer bag. The filtering capacity of this type of dust collector, however, is limited by the large ratio of fluid area to filter media area resulting as a consequence of the air being filtered only as it enters the annular passageway from either the inner or outer bag. Consequently, the filtering process is complete once the air reaches the annular passageway and a great portion of the filter media represented by the inner and outer bags is not utilized.

There is need to provide an apparatus for filtering particulate matter from a fluid stream in which the dust collecting capacity is increased by reducing the ratio of the area of the fluid stream to the area of the filter media and increasing the filter media coming in contact with the fluid stream. Furthermore, there is need to increase the filter capacity of the apparatus without an accompanying increase in the physical size of the filtering apparatus.

SUMMARY OF THE INVENTION

In accordance with the present invention there is provided an apparatus for filtering particulate matter from a fluid stream which includes a first fabric housing having a longitudinal chamber with an open upper end portion and a lower end portion which is adapted to receive the fluid stream. A second fabric housing having a longitudinal chamber is concentrically positioned within the first fabric housing chamber. The second fabric housing is secured at preselected intervals to the interior surface of the first fabric housing such that the chamber of the first fabric housing is divided into a plurality of separate and distinct longitudinal passageways. The longitudinal passageways surround the second fabric housing chamber and are arranged to receive the fluid stream. The passageways have sealed upper end portions and open lower end portions. The first fabric housing is suitably supported at its upper and lower end portions to receive the fluid stream. The longitudinal passageways may be further provided with means for collecting and removing particulate matter deposited on the surfaces of the first and second fabric housings.

One feature of the present invention includes the second fabric housing having a lower end portion which converges in a cone. An orifice is formed at the tip of the cone and is arranged to expand and contract such that when fluid with entrained particulate matter flows upwardly through the first fabric housing chamber the orifice closes to prevent flow through the orifice into the second fabric housing chamber. With this arrangement, the fluid flow is directed through the longitudinal passageways. During the cleaning operation, the cone expands and the orifice opens to permit particulate matter that may have collected on the inside surface of the first fabric housing to fall through the orifice into the lower end portion of the first fabric housing chamber.

Further, in accordance with the practice of the present invention, a cap member seals the upper end portion of the first fabric housing and is provided with a plurality of openings which communicate with each of the longitudinal passageways. Nozzles may be positioned in the openings for the passage of the filtered stream from the longitudinal passageways. For cleaning the filtration apparatus, air from an external source is pulsed through the openings in the cap members to remove particulate matter which has collected within the longitudinal passageways.

Accordingly, the principal object of this invention is to provide an apparatus for filtering particulate matter from a fluid stream whereby the combination of an inner fabric housing secured within an outer fabric housing forms a plurality of longitudinal passageways through which the fluid stream passes to filter the particles from the stream in such a manner that the filtering capacity is increased by reducing the ratio of air to filter media.

Another object of this invention is to provide a filtration apparatus in which the filtering capacity is substantially increased without increasing the physical size of the filtration apparatus.

Still another object of this invention is to provide a gas filtering apparatus in which the particulate matter collected within the apparatus may be removed therefrom periodically during the filtering operation.

These and other objects of this invention will be more completely described and disclosed in the following specification, the accompanying drawings and the appended claims.

DESCRIPTION OF THE PREFERRED EMBODIMENTS

Figure 1:
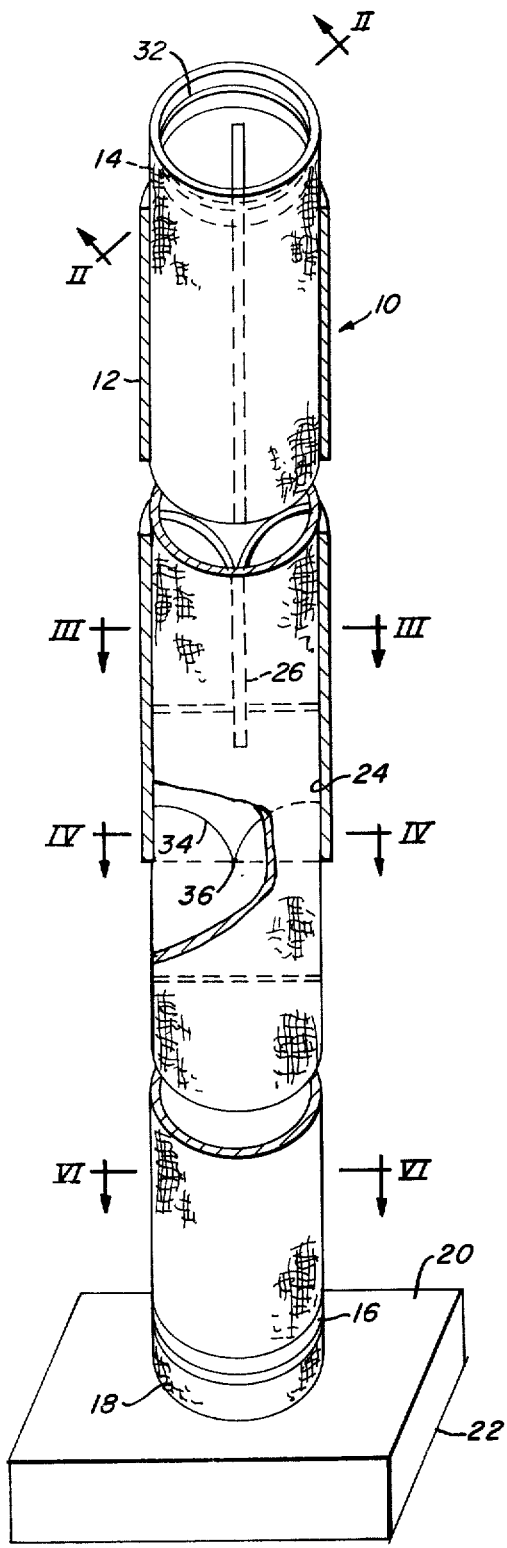
FIG. 1 is a schematic representation of the filtration apparatus, illustrating an outer fabric housing surrounding an inner fabric housing secured to the interior of the outer fabric housing through which a fluid stream is directed for separating therefrom entrained particulate matter.

Referring to the drawings, and more particularly FIGS. 1–6, there is illustrated an apparatus for filtering solid particulate matter from a fluid stream generally designated by the numeral 10 having a first or outer fabric housing 12 arranged in a tubular configuration. The housing 12 is a textile fabric preferably constructed by the process of weaving, felting, knitting or needling. The textile fiber may be selected from wool, cotton, nylon, rayon, acetate, polyester or any other suitable natural or synthetic fiber.

The upper end portion of the outer fabric housing 12 is open to the atmosphere and is supported by an annular ring member 14. The lower end portion of the housing 12 is, in turn, connected by an annular ring 16 to a conduit 18 that projects upwardly through a porous cover plate 20 associated with a suitable dust collecting device 22. The dust collector 22 is exemplary of a conventional dust collecting device adapted to receive a fluid stream for separating therefrom entrained particulate matter. Thus, the filtering apparatus 10 may be operably combined with conventional air or gas cleaning devices associated with combustion chambers, stacks, precipitators and the like to further aid in the separation of solid particulates and other pollutants from a fluid stream before it enters the atmosphere.

Figure 3:
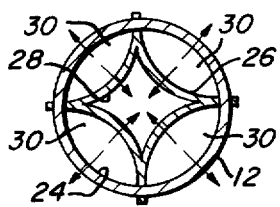
FIG. 3 is a top plan view taken along the line III—III of FIG. 1, illustrating the arrangement of the longitudinal passageways formed by the second fabric housing positioned within the inner and outer fabric housings.

The fluid stream with entrained particulate matter passes through the porous cover plate 20 of the dust collector 22 and enters the open lower end portion of the outer fabric housing 12 into a chamber 24 thereof. Then a portion of the fluid stream in the chamber 24 flows outwardly through the outer fabric housing 12 with the separated particulate matter collecting on the inside surfaces thereof. The fluid stream with entrained particulate matter remaining in the chamber 24 continues to flow upwardly toward a second or inner fabric housing 26 which is positioned concentrically within the outer housing 12. The inner housing 26 is fabricated from the same material as that of the outer housing 12. As illustrated in FIGS. 1 and 3, the inner housing 26 is secured at preselected intervals at its upper end portion to the interior surface of the upper end portion of the outer housing 12.

The inner housing 26 secured to the outer housing 12 forms an interior diamond shaped chamber 28 surrounded by a plurality of separate and distinct longitudinal passageways 30 as illustrated in FIG. 3. The passageways 30 are sealed at their upper end portions and open at their lower end portions to receive the fluid stream with entrained particulate matter from the chamber 24. With this arrangement, the fluid stream is directed into the passageways 30 and flows upwardly therethrough. The stream may pass either inwardly through the inner housing 26 into the chamber 28 or outwardly through the first housing 12 to the surrounding atmosphere. The particulates are retained within the passageways 30 and kept from escaping to the atmosphere. The particles are deposited on the outside surface of the inner housing 26 and on the inside surface of the outer housing 12. Thus, the fluid stream passing from the passageways 30 contacts the outer and inner fabric housings 12 and 26 to thereby separate the entrained particulates from the fluid.

Figure 2:
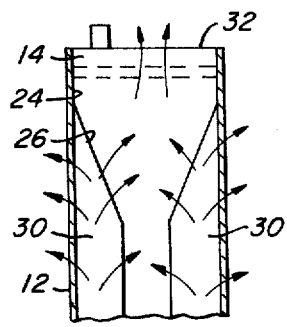
FIG. 2 is a fragmented view in side elevation taken along the line II—II of FIG. 1, illustrating the upper end portion of the outer fabric housing containing a plurality of longitudinal passageways formed by the inner fabric housing.

The upper end portions of the longitudinal passageways 30 are sealed from communication with the chamber 28 so that the particulate matter is confined within the passageways 30 and is thus prevented from mixing with the filtered fluid stream which passes from the passageways 30. The flow of the filtered fluid stream from the passageways 30 is illustrated in FIGS. 2 and 3. The portion of the filtered stream which follows a path into the chamber 24 flows vertically upwardly and exits from the chamber 24 through the open upper end portion 32 which is supported by the annular ring member 14. With this arrangement, the fluid stream substantially free of particulate matter may pass in an unobstructed manner from the chamber 24 of the housing 12.

Figure 4:
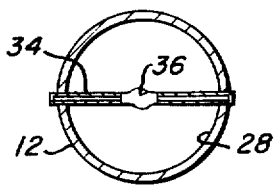
FIG. 4 is a plan view taken along the line IV—IV of FIG. 1, illustrating the lower end portion of the second fabric housing having an expandable opening shown in closed position.
Figure 5:
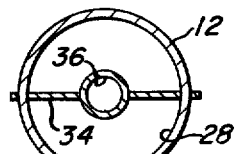
FIG. 5 is a plan view taken along the line IV—IV of FIG. 1, illustrating the opening of the lower end portion of the second fabric housing in expanded position.
Figure 6:
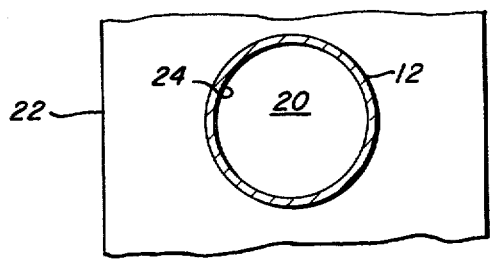
FIG. 6 is a plan view taken along the line VI—VI of FIG. 1, illustrating the lower end portion of the first fabric housing which receives the fluid stream with entrained particulate matter.

The lower end portion of the inner housing 26 converges in a cone 34. As illustrated in FIGS. 4 and 5, the cone 34 may be provided with an orifice 36 for connecting the outer housing chamber 24 with the inner housing chamber 28. The cone 34 is expandable and with the provision of the orifice 36 the upward flow of the fluid stream compresses the cone to close the orifice 36 and thereby seal the chamber 24 from the chamber 28. With this arrangement, the upwardly flowing fluid stream with entrained particulate matter passes from the dust collector 22 to the chamber 24 and by contraction of the orifice 36 in the cone 34 is prevented from entering the chamber 28 and is thus directed into the passageways 30.

At periodic intervals during the filtering operation particulates which may have passed through the inner housing 26 into the chamber 28 and other particulates collected on the inside surface of the outer housing 12 and the outside surface of the inner housing 26 are removed by directing a reverse flow of clean air through the open end portion 32. This reverse air flow expands the cone 34 at the lower end portion of the chamber 28 to open the orifice 36, as shown in FIG. 5, and permit particulate matter to be discharged from the chamber 28 into the chamber 24. The particulates collect on the cover plate 20 of the dust collector 22 and are removed from the filtering apparatus 10.

With the above described arrangement of the inner fabric housing 26 positioned within the chamber 24 and secured to the outer fabric housing 12 to form the longitudinal passageways 30, the capacity of the filtering apparatus 10 to separate particulate matter from the fluid stream is substantially increased by increasing the filtration media coming in contact with the fluid stream without increasing the physical size of the apparatus 10. The outer and inner fabric housings 12 and 26 provide increased surface area of filter media for receiving a given cross section of the fluid stream and thereby enhance the effectiveness of the filtering apparatus 10 to separate the particulate matter from the fluid stream. Thus, as the fluid stream with entrained particulate matter continues to flow upwardly through the chamber 24, it encounters either the outer housing 12 or the inner housing 26. The particulate matter collects on the surfaces of the fabric housings, and the fluid stream is expelled to the atmosphere surrounding the filtration apparatus 10 and is substantially free of entrained particulate matter.

Figure 7:
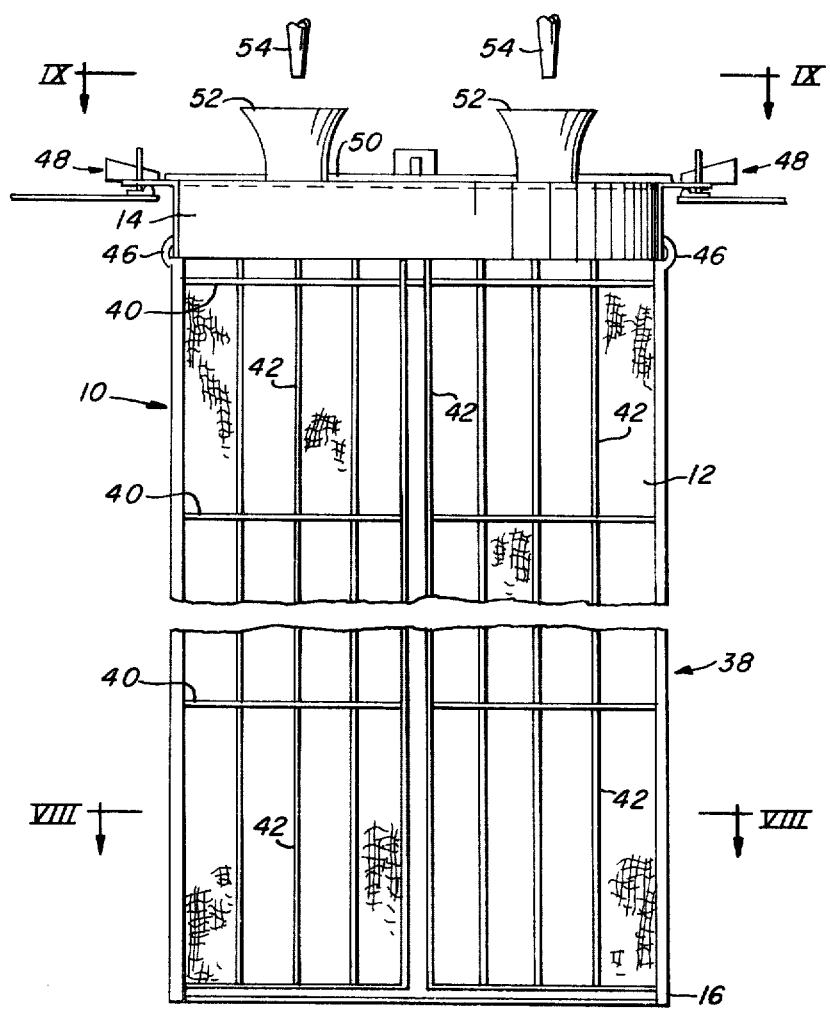
FIG. 7 is a sectional view in side elevation of another embodiment of the present invention, illustrating the filtration apparatus having an exterior support cage surrounding the first fabric housing and nozzles positioned above the upper end portion of the first fabric housing.
Figure 8:
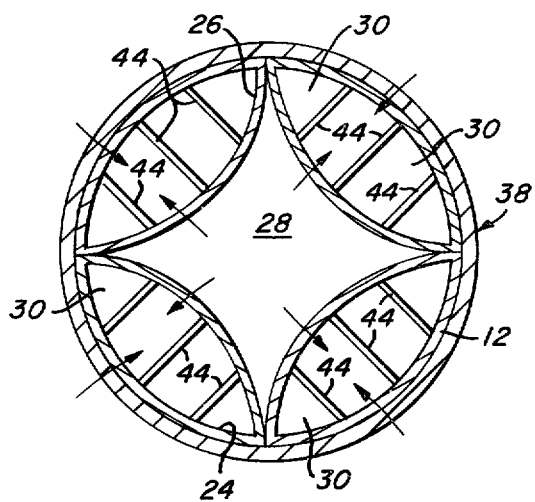
FIG. 8 is a plan view taken along the line VIII—VIII of FIG. 7, illustrating a plurality of horizontally positioned support members for preventing collapse of the longitudinal passageways.
Figure 9:
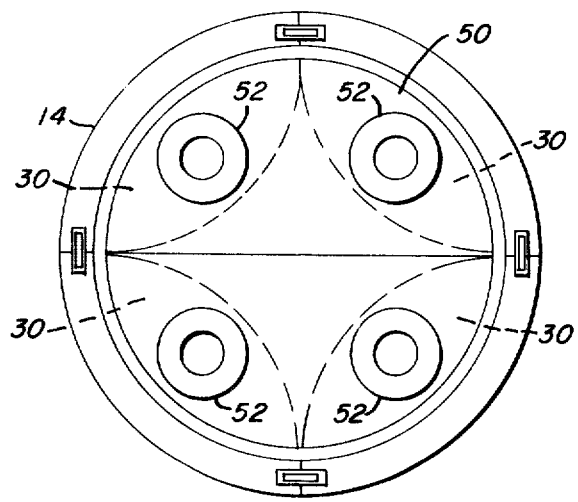
FIG. 9 is a plan view taken along the line IX—IX of FIG. 8, illustrating the top of the filtration apparatus which includes the nozzles through which the filtered fluid passes from the passageways.

Referring to FIGS. 7-9, there is illustrated a second embodiment of the present invention in which like numerals indicated in FIGS. 1-6 refer to like parts in FIGS. 7-9. The outer fabric housing 12, in addition to being supported by the ring members 16 and 14, is also externally supported by a cage network generally designated by the numeral 38. The cage 38 includes a plurality of horizontally spaced circular members 40 which are secured, in turn, to a plurality of vertically extending members 42. In addition to the external support cage 38 surrounding the outer housing 12, the longitudinal passageways 30 include a plurality of horizontally positioned support members 44. The support cage 38 may also have a helical configuration.

The support members 44, as illustrated in FIG. 8, are secured at their end portions to the inner surface of the outer housing 12 and to the outer surface of the inner housing 26. With this arrangement, the longitudinal passageways 30, having sealed lower end portions and open upper end portions, are maintained in expanded position to permit passage of the filtered fluid stream from the outer housing 12. The support members 44 also serve to prevent collapse of the passageways 30 during the cleaning operation.

A clamp 46 secures the housing 12 to the ring member 14 at the upper end portion of the outer housing 12. The ring member 14 may be secured to a suitable mounting device, such as the bracket generally designated by the numeral 48, for positioning the filtering apparatus 10 to receive the fluid stream. A circular plate or cap 50 is positioned above the ring member 14 to seal the upper end portions of the chambers 24 and 28 from the surrounding atmosphere. The plate 50 is provided with a plurality of openings which overlie the respective passageways 30 and permit the passage of the filtered stream therefrom. In FIGS. 7 and 9, the openings in the plate 50 are provided with nozzles 52 for directing the filtered fluid stream from the passageways 30 to the surrounding atmosphere.

Further in accordance with the second embodiment of the present invention, the fluid stream with entrained particulate matter enters the passageways 30 from the open lower end portion of the inner housing chamber 28 or through the exterior surface of the outer housing 12. The fluid stream passes through the inner housing 26 into the passageways 30 with the entrained particulate matter collecting on the interior surface of the inner housing 26. Particulate matter also collects on the exterior surface of the outer housing 12. The filtered fluid stream is substantially free of particulate matter as it flows through the passageways 30 and exits therefrom through the openings in the plate 50 or the nozzles 52 to the surrounding atmosphere.

In the event that particulate matter should pass with the fluid stream into the passageways 30, the particulates are removed therefrom during the cleaning operation which takes place periodically. Clean air under pressure may be directed from a fan or nozzles 54, as illustrated in FIG. 7, positioned above the filtering apparatus 10 through the nozzles 52 or openings in the plate 50 into the passageways 30. In addition, the plate 50 may be removed from connection with the ring 14 to permit the introduction of clean air into the inner housing chamber 28 for removing the particulate matter which has collected on the interior surface of the inner housing 26. The clean air introduced into the passageways 30 passes downwardly through the chamber 28 and outwardly through the exterior surface of the outer housing 12. In this fashion, the particulate matter deposited on the interior surface of the housing 26 and the exterior surface of the housing 12 is effectively removed.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. An apparatus for filtering particulate matter from a fluid stream comprising,
    a first fabric housing having a longitudinal chamber with an open upper end portion and an open lower end portion adapted to receive said fluid stream,
    a second fabric housing having a longitudinal chamber concentrically positioned within said first fabric housing chamber,
    said second fabric housing secured at preselected intervals to the interior surface of said first fabric housing such that said chamber thereof is divided into a plurality of separate and distinct longitudinal passageways surrounding said second fabric housing chamber and arranged to receive said fluid stream,
    said passageways having sealed upper end portions and open lower end portions,
    means for supporting said first fabric housing to receive said fluid stream, and
    said fabric housing having a lower end portion converging in a cone,
    said cone having an orifice arranged to expand and contract to permit discharge of particulate matter from said second fabric housing chamber through said orifice to said open lower end portion of said first fabric housing chamber.

2. An apparatus for filtering particulate matter from a fluid stream as set forth in claim 1 which includes,
    means for sealing said first fabric housing open upper end portion.

3. An apparatus for filtering particulate matter from a fluid stream as set forth in claim 2 which includes,
    a cap member secured to said first fabric housing upper end portion, and
    a plurality of openings provided in said cap member and communicating with said longitudinal passageways.

4. An apparatus for filtering particulate matter from a fluid stream as set forth in claim 3 which includes,
    each of said openings provided with a nozzle through which said fluid stream flows from said longitudinal passageways substantially free of particulate matter.

5. An apparatus for filtering particulate matter from a fluid stream as set forth in claim 1 in which said supporting means includes,
    a first annular ring member secured to and surrounding said first fabric housing upper end portion,
    a second annular ring member surrounding said first fabric housing lower end portion and cooperating with said first ring member to maintain said first fabric housing in a tubular configuration,
    a support cage surrounding said first fabric housing and secured to said first and second ring members, and
    a plurality of horizontally positioned support members secured to the exterior surface of said second fabric housing and the interior surface of said first fabric housing in each of said passageways,
    said support member arranged to prevent said passageways from collapsing as said fluid stream passes therethrough.

6. An apparatus for filtering particulate matter from a fluid stream as set forth in claim 1 which includes,
    said passageways each having a lower open end portion arranged to receive said fluid stream from said first fabric housing chamber, and
    a sealed upper end portion separated from said first fabric housing chamber.

7. An apparatus for filtering particulate matter from a fluid stream as set forth in claim 1 which includes,
    said passageways each having an open upper end portion and a sealed lower end portion.

* * * * *